United States Patent
Scholz et al.

(10) Patent No.: US 9,470,146 B2
(45) Date of Patent: Oct. 18, 2016

(54) SHAFT ASSEMBLY OF AN EXHAUST-GAS TURBOCHARGER

(75) Inventors: Georg Scholz, Woellsten (DE); Martin Becker, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 602 days.

(21) Appl. No.: 13/515,056

(22) PCT Filed: Dec. 14, 2010

(86) PCT No.: PCT/US2010/060207
§ 371 (c)(1),
(2), (4) Date: Jun. 11, 2012

(87) PCT Pub. No.: WO2011/087662
PCT Pub. Date: Jul. 21, 2011

(65) Prior Publication Data
US 2013/0004300 A1    Jan. 3, 2013

(30) Foreign Application Priority Data

Dec. 22, 2009  (DE) .................. 10 2009 060 056

(51) Int. Cl.
*F02C 6/12*     (2006.01)
*F01D 5/02*     (2006.01)

(52) U.S. Cl.
CPC .................. *F02C 6/12* (2013.01); *F01D 5/025* (2013.01); *F05B 2260/301* (2013.01)

(58) Field of Classification Search
CPC .... F04D 29/053; F04D 29/054; F01D 5/025; F02C 6/12; F05B 2260/301

USPC ......... 416/244 R, 244 A, 241 R, 241 B, 174; 417/406–409

See application file for complete search history.

(56) References Cited

U.S. PATENT DOCUMENTS

| 4,183,719 | A  | * | 1/1980  | Bozung ......................... 416/183 |
| 5,022,823 | A  | * | 6/1991  | Edelmayer ................ 416/244 A |
| 6,896,479 | B2 | * | 5/2005  | Svihla et al. ................. 415/104 |
| 7,008,191 | B2 | * | 3/2006  | Billington ................. 416/204 A |
| 7,470,115 | B2 | * | 12/2008 | Meacham ............... F01D 5/025 |
|           |    |   |         | 416/204 A |
| 2004/0131469 | A1 |  | 7/2004 | Billington |

FOREIGN PATENT DOCUMENTS

JP      2002089490 A    3/2002

* cited by examiner

*Primary Examiner* — Richard Edgar
*Assistant Examiner* — Brian P Wolcott
(74) *Attorney, Agent, or Firm* — A. Michael Tucker; Stephan A. Pendorf; Patent Central LLC

(57) ABSTRACT

The invention relates to a shaft assembly (1A) of an exhaust-gas turbocharger (1) having a shaft (5), having a turbine wheel (2) which can be connected to one end of the shaft (5) to form a rotor, having a compressor wheel (12) which can be connected to the other end of the shaft (5), having a sealing sleeve (14) which can be located on the shaft (5) on that side of the compressor wheel (12) which faces toward the turbine wheel (2), having a shaft nut (15) which can be screwed by means of an internal thread (17) onto a free end region (16) of the shaft (5) to fix the compressor wheel (12), wherein the shaft nut (15), in a portion (19) adjacent to the compressor wheel (12), has a turned recess (18) which adjoins the internal thread (17) and which has an inner diameter ($D_2$) greater than the internal thread diameter ($D_1$).

11 Claims, 5 Drawing Sheets

SHAFT ASSEMBLY OF AN EXHAUST-GAS TURBOCHARGER

Figure 1:
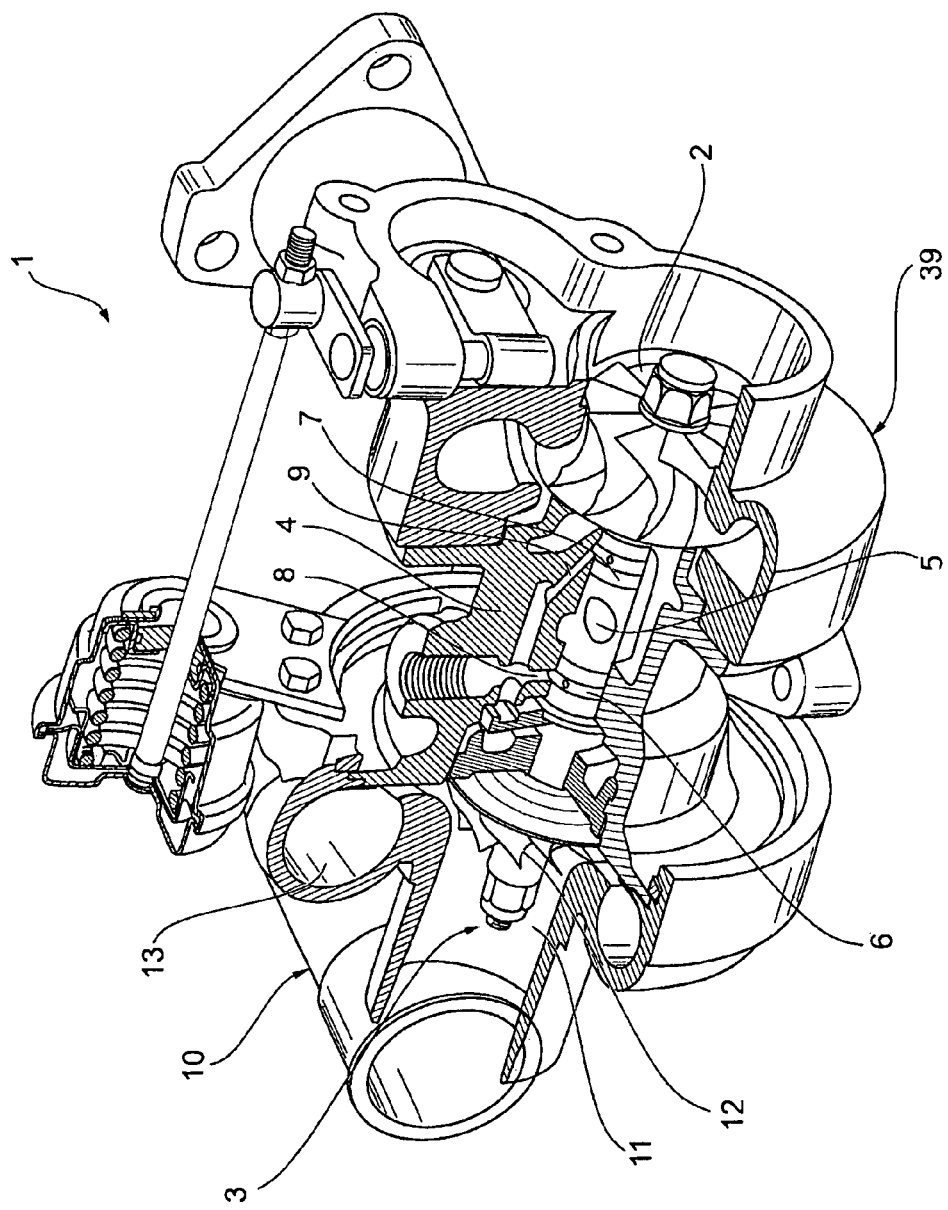

The invention relates to a shaft assembly of an exhaust-gas turbocharger according to the preamble of claim 1.

A shaft assembly of said type according to the prior art has the problem of static overdeterminacy, which leads to bending stresses or constraining forces in the shaft assembly. This in turn results in an undesired reduction in the elasticity of the shaft assembly, which in turn can lead to imbalances. Furthermore, in real vehicle operation, an exhaust-gas turbocharger is subjected to high accelerations and temperatures. This leads to the occurrence of extreme forces in the screw connection of the compressor wheel, as a result of which retroactive settling can likewise occur.

As a result of said processes, the imbalance of the rotor or of the shaft assembly is in turn varied, which can cause undesired noises in the vehicle.

It is therefore an object of the present invention to provide a shaft assembly of an exhaust-gas turbocharger system according to the preamble of claim 1, which shaft assembly permits a reduction in imbalances occurring during operation and in associated disturbing noises.

Said object is achieved by means of the features of claim 1.

Since the shaft nut has a nut bore, the expansion length of the shaft assembly is increased, which alone contributes considerably to the achievement of the aims stated in the introduction.

The subclaims relate to advantageous refinements of the invention.

In one particularly preferred embodiment, the shaft nut has a housing region which, by means of the enlargement of the outer diameter, provides an enlarged contact surface with the compressor wheel, which permits a reduced contact pressure and the realization of a greater preload force.

By means of the sleeve bore in the sealing sleeve, it is made possible for the sealing sleeve to tilt slightly about its center of gravity and to rest evenly on both sides. This yields the advantage of the largest possible contact surface in the screw connection and therefore a reduced contact pressure. As a result of the central position of the centering or of the central region between the bores or the inner regions which are enlarged in terms of inner diameter, the influence of the sealing sleeve on possible imbalances remains unchanged.

It is preferable also for the compressor wheel to be designed to be axially as short as possible, that is to say that part of the compressor wheel which projects axially beyond the blade leading edges is designed to be as short as possible.

In particular if aluminum alloys are used for the material of the compressor wheel, it should be taken into consideration that the coefficient of thermal expansion of aluminum (approximately 2.33) is twice that of steel. In this way, the stress in the shaft assembly can be reduced by the shortening of the compressor wheel in relation to known compressor wheels.

The shaft, or the rotor constructed from the shaft and the turbine wheel, is provided preferably with two waisted portions which result in good flexibility of the shaft. The thermal expansion of the components in the shaft assembly can also be compensated, which allows plasticizing and therefore imbalance variation to be avoided.

The compressor wheel can nevertheless still be centered in the best possible fashion, as far as over the support regions, at its points with the least bore flaring.

Figure 2:
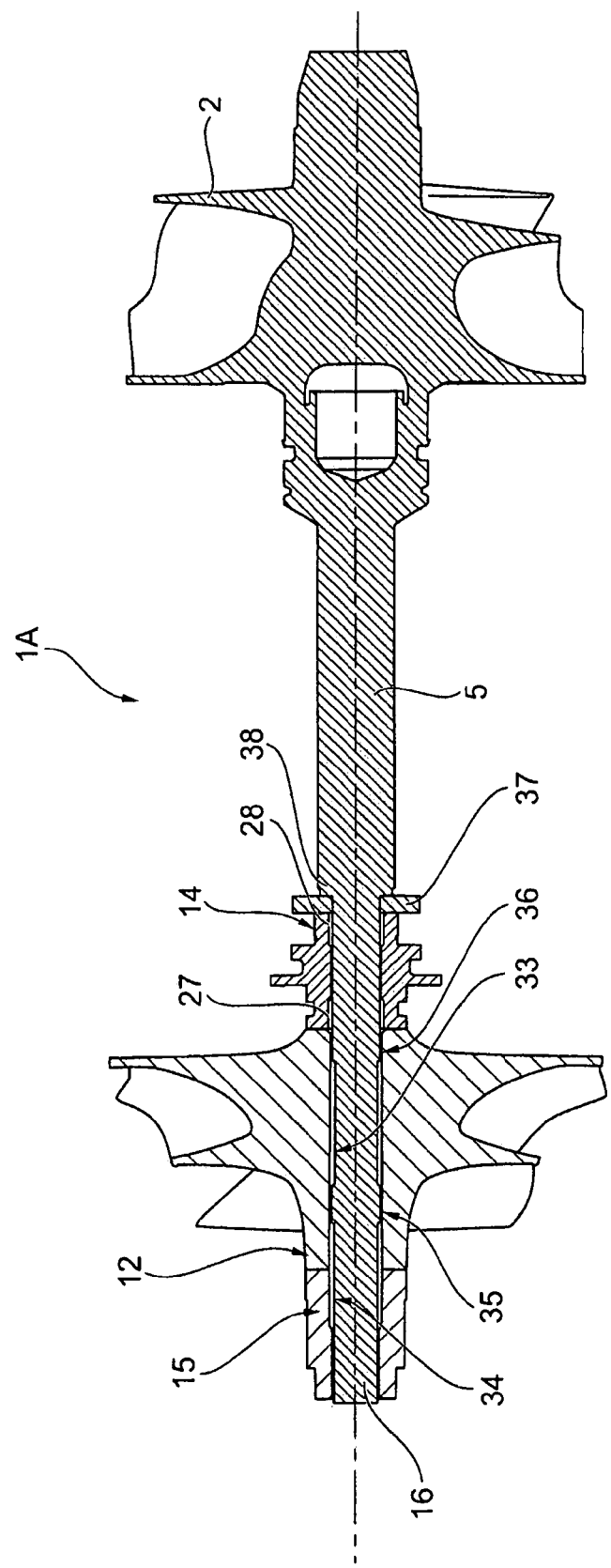
Figure 3A:
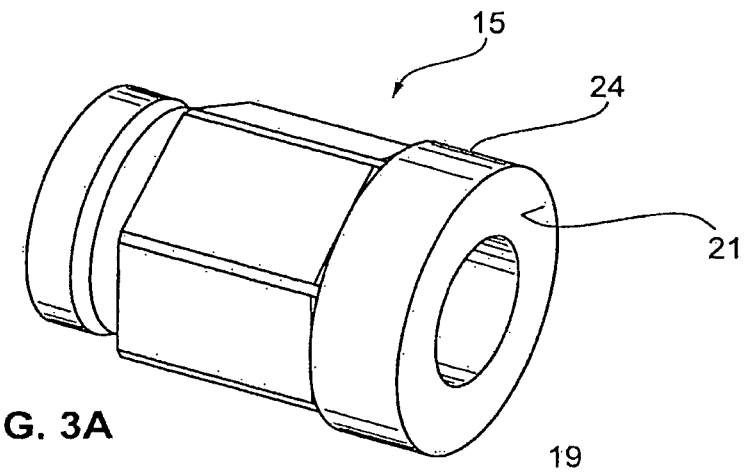
Figure 3B:
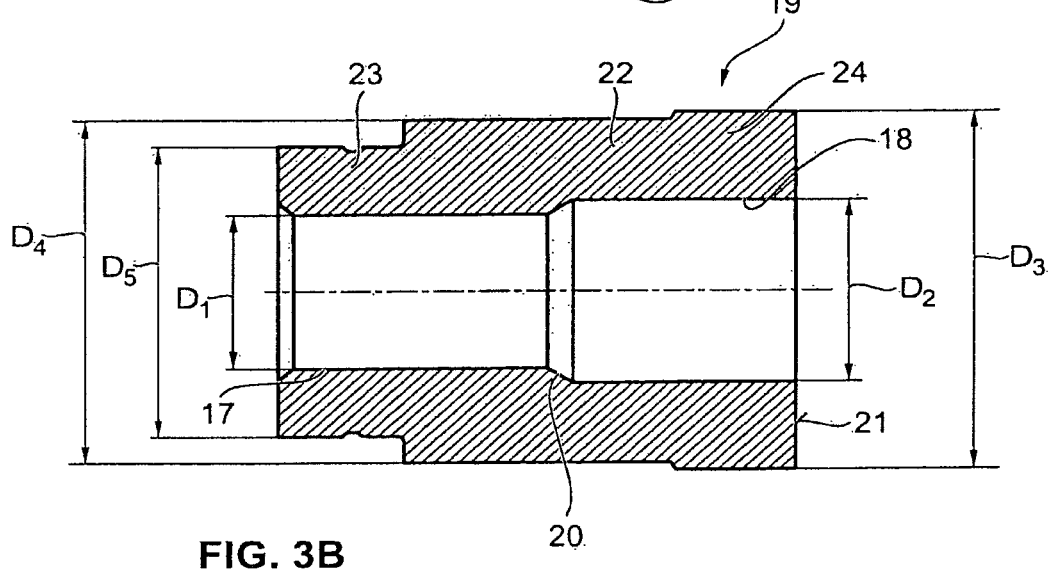
Figure 4:
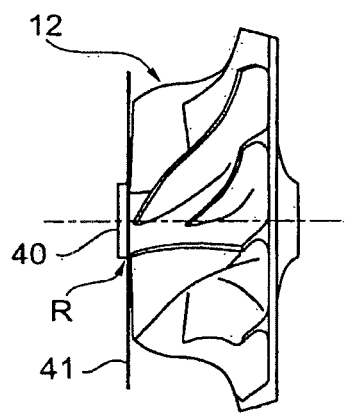
Figure 5:
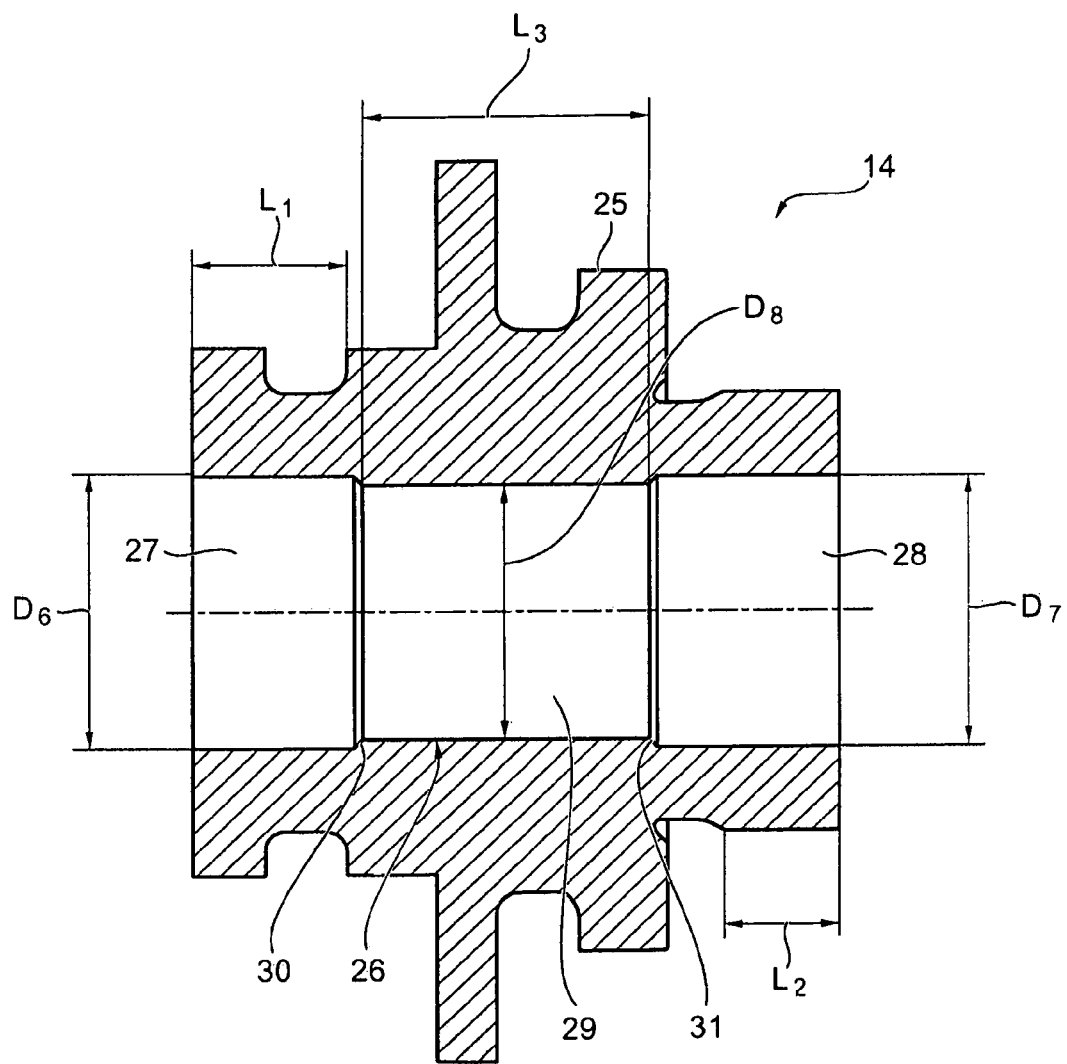
Figure 6:
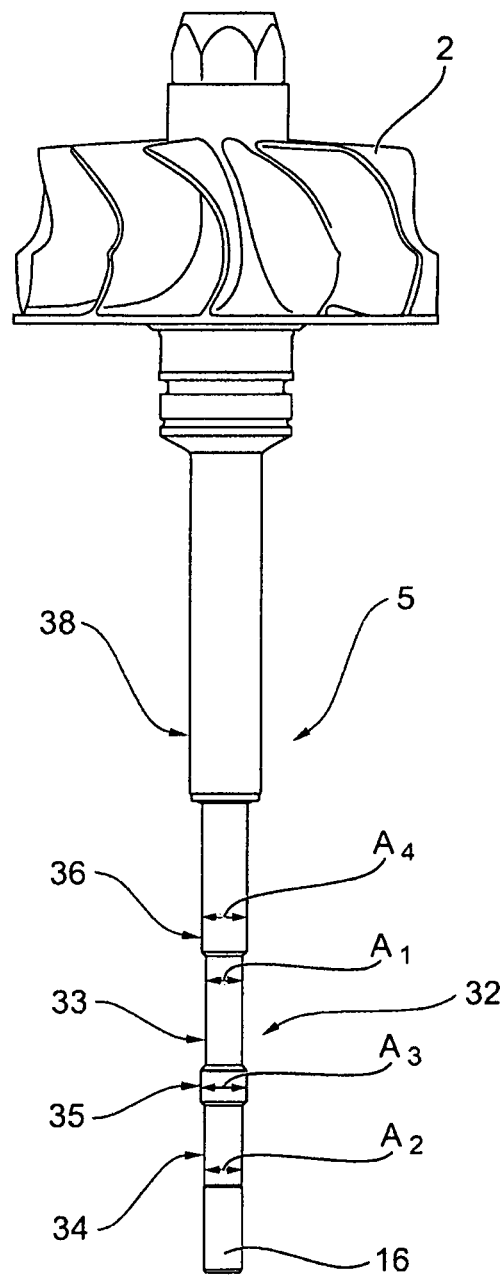

Further details, advantages and features of the invention will emerge from the following description of exemplary embodiments on the basis of the appended drawing, in which:

FIG. 1 shows a perspective sectional view of an exhaust-gas turbocharger according to the invention, FIG. 2 shows a side view of a shaft assembly according to the invention, FIG. 3A shows a perspective illustration of a shaft nut of the shaft assembly according to the invention, FIG. 3B shows a sectional illustration of the shaft nut according to FIG. 3A, FIG. 4 shows a side view of a compressor wheel of the shaft assembly according to the invention, FIG. 5 shows a sectional illustration of a sealing sleeve of the shaft assembly according to the invention, and FIG. 6 shows a side view of a rotor of the shaft assembly according to the invention.

The perspective sectional view of FIG. 1 shows an exhaust-gas turbocharger 1 which has a turbine housing 39, a bearing housing 4 and a compressor housing 10 with a compressor spiral 13.

Arranged in the interior of the bearing housing 4 is a shaft 5, to the turbine-side end of which is fastened a turbine wheel 2 and to the opposite end of which is fastened a compressor wheel 12 in a housing interior space 11 of the compressor housing 10. The shaft 5, which with the turbine wheel 2 and compressor wheel 12 fastened thereto forms a rotor of the exhaust-gas turbocharger, is supported in the bearing housing 4 by means of two floating sleeve bearings 6, 7 which are supplied with lubricant via two oil supply lines 8, 9 formed in the bearing housing 4.

FIG. 2 shows a side view of a shaft assembly 1A according to the invention of the exhaust-gas turbocharger 1 with the turbine wheel 2 fastened to the turbine-side end of the shaft 5 and with the compressor wheel 12 fastened to the other end of the shaft 5. Here, to fasten the compressor wheel 12, a stop disk 37, a sealing sleeve 14 and the compressor wheel 12 are pushed onto or attached to the free end region 16 of the shaft 5 as far as its region 38 which has a greater diameter than the free end region 16 of the shaft 5. The compressor wheel 12, the sealing sleeve 14 and the stop disk 37 are fixed to the rotor by means of a shaft nut 15. Here, waisted portions 33, 34 and support regions 35, 36 (see FIG. 5) are also provided on the end region 16 of the shaft 5.

As can be seen from the perspective illustration of FIG. 3A, the shaft nut 15 has, on a first housing region 24, an end-side contact surface 21 which faces toward the compressor wheel 12. On account of the large contact surface 21, a reduced contact pressure or greater preload force is obtained between the shaft nut and the compressor wheel 12. As can be seen from the sectional illustration of FIG. 3B, the shaft nut 15 has a portion 19 which is divided into the first region 24 with a diameter $D_3$ and a second region 22 with a diameter $D_4$. The region 22 is adjoined by a third region 23 with a diameter $D_5$. Here, the diameter $D_3$ is greater than the diameter $D_4$, which in turn is greater than the diameter $D_5$. In the portion 19 adjoining the compressor wheel 12, the shaft nut 15 has a shaft nut bore 18 which adjoins the internal thread 17 and which has an inner diameter $D_2$ greater than the internal thread diameter $D_1$, which inner diameter $D_2$ extends in the first region 24 as far as partially into the second region 22. In contrast, the internal thread 17 extends in the third region 23 as far as partially into the second region 22. The shaft nut bore 18 in the shaft nut 15 results in a shortened engagement length of the internal thread 17 into the external thread 5, and therefore an increase in the expansion length of the shaft nut 15.

The perspective illustration of FIG. 4 shows a compressor wheel 12 whose structural length is formed by means of a shortening of the hub in relation to conventional compressor wheels. Here, the plane of the start of the hub projects axially beyond, the plane of the blade leading edges approximately only by the distance of the blade root rounding. The short structural length of the compressor wheel 12 leads to a smaller length expansion of the component in the event of heating. In order to further reduce the stress in the shaft assembly, the compressor wheel 12 of the shaft assembly according to the invention is preferably produced from an aluminum alloy on account of its having a coefficient of thermal expansion twice that of steel.

As can be seen in detail from the sectional illustration of the sealing sleeve 14 in FIG. 5, the sealing sleeve 14 has a sleeve housing 25 with a sleeve bore 26. The sleeve bore 26 has two end regions 27, 28 whose inner diameters $D_6$, $D_7$ are greater than an inner diameter $D_8$ of a central region 29, which is arranged between the end regions 27, 28, of the sleeve bore 26. Here, a length $L_3$ of the central region 29 of the sealing sleeve 14 is preferably greater than the lengths $L_1$, $L_2$ of the end regions 27, 28, which in turn are preferably identical. As can also be seen from FIG. 5, in each case one transition region 30 and 31 which increases continuously in diameter is provided between the end regions 27 and 28 and the central region 29. On account of the inner diameters $D_6$ and $D_7$ which are enlarged in relation to the central region 29 by bores, the sealing sleeve 14 can tilt about its center of gravity on the shaft 5 and thereby rest evenly and without bending stresses on both sides.

The side view from FIG. 6 shows a rotor of the shaft assembly 1A according to the invention. As can be seen from FIG. 6, the shaft 5 here has, as viewed from the direction of the turbine wheel 2, the shaft region 38 with a continuously constant diameter, which shaft region 38 is adjoined by a bearing region 32 for the compressor wheel 12. The bearing region 32 has two waisted portions 33 and 34 with an outer diameter $A_1$ and $A_2$ respectively and has two support regions 35 and 36 with an outer diameter $A_3$ and $A_4$ respectively, which support regions 35 and 36 adjoin or are arranged adjacent to the waisted portions 33, 34. Here, the compressor wheel 12 is centered on the support regions 35 and 36, while the waisted portions 33 and 34 considerably increase the elasticity and the thermal expansion or flexibility of the shaft 5, as a result of which the thermal expansion of the components in the shaft assembly is better compensated.

To supplement the disclosure, in addition to the above written disclosure of the invention, reference is hereby explicitly made to the diagrammatic illustration thereof in FIGS. 1 to 6.

LIST OF REFERENCE SYMBOLS

1 Exhaust-gas turbocharger
1A Shaft assembly
2 Turbine wheel
3 Compressor
4 Bearing housing
5 Shaft
6, 7 Floating sleeve bearing
8, 9 Oil supply lines
10 Compressor housing
11 Housing interior space
12 Compressor wheel
13 Compressor spiral
14 Sealing sleeve
15 Shaft nut
16 Free end region of the shaft
17 Internal thread
18 Shaft nut bore
19 Portion
20 Transition region
21 Contact surface
22, 23, 24 Regions
25 Sleeve housing
26 Sleeve bore
27, 28 End regions of the sleeve bore
29 Central region
30, 31 Transition regions
32 Bearing region
33, 34 Waisted portions
35, 36 Support regions
37 Stop disk
38 Shaft region
39 Turbine housing
40 Plane of start of hub
41 Blade leading edge plane
R Blade root rounding

The invention claimed is:

1. A shaft assembly (1A) of an exhaust-gas turbocharger (1) having
a shaft (5) having a first end and a second end, and having waisted portions and non-waisted portions, and at least one outer diameter,
a turbine wheel (2) connected to the first end of the shaft (5) to form a rotor,
a compressor wheel (12) having a hub, a shaft nut end and a sealing sleeve end, the compressor wheel (12) connected to the second end of the shaft (5) and supported on said non-waisted portions, whereby a free annular space is formed between the compressor wheel and the shaft in the waisted portions,
a sealing sleeve (14) located on the shaft (5) on a side of the compressor wheel (12) which faces toward the turbine wheel (2), wherein the sealing sleeve (14) has two end faces and a sleeve bore (26) which has two end regions (27, 28) whose inner diameters (D6, D7) are greater than an inner diameter (D8) of a central region (29), whereby a free annular space is formed between a non-waisted portion of the at least one shaft outer diameter and the sealing sleeve inner diameter in the respective two end regions (27, 28) of the sealing sleeve (14), whereby the sealing sleeve (14) is enabled to tilt about its center of gravity and to rest evenly on said two end faces upon tightening of the compressor nut,
a shaft nut (15) screwed by means of an internal thread (17) onto a free end region (16) of the second end of the shaft (5) to fix the compressor wheel (12) by contact at a plane of the shaft nut end of the compressor wheel hub (40),
wherein the shaft nut (15), in a portion (19) adjacent to the compressor wheel (12), has a shaft nut bore (18) extending from the internal thread (17) to the compressor wheel, and wherein the shaft nut bore (18) of the shaft nut (15) has an inner diameter (D2) greater than
(a) an internal thread diameter (D1) of the shaft nut (15) and
(b) a shaft outer diameter of the shaft (5) inside the shaft nut bore (18),
whereby securing of the shaft nut (15) to shaft (5) forms a free annular space between the shaft nut (15) and the shaft (5) from the start of the compressor wheel hub (40) to the internal thread (17), and wherein at least one free annular space between compressor wheel and shaft communicates with the free annular space between the shaft nut (15) and the shaft (5).

2. The shaft assembly (1A) as claimed in claim 1, wherein the shaft nut bore (18) adjoins the internal thread (17) via a transition region (20) with a continuously increasing diameter.

3. The shaft assembly (1A) as claimed in claim 1, wherein the portion (19) of the shaft nut (15) which is adjacent to the compressor wheel (12) has a region (24) with a contact surface (21) whose outer diameter (D3) is greater than outer diameters (D4, D5) of adjoining regions (22, 23) of the shaft nut.

4. A shaft assembly (1A) of an exhaust-gas turbocharger (1) having
- a shaft (5) having a first end and a second end, and at least one diameter,
- a turbine wheel (2) connected to the first end of the shaft (5) to form a rotor,
- a compressor wheel (12) having a hub, a shaft nut end and a sealing sleeve end, the compressor wheel (12) connected to the second end of the shaft (5),
- a sealing sleeve (14) located on the shaft (5) on a side of the compressor wheel (12) which faces toward the turbine wheel (2),
- a shaft nut (15) screwed by means of an internal thread (17) onto a free end region (16) of the second end of the shaft (5) to fix the compressor wheel (12) by contact at a plane of the shaft nut end of the compressor wheel hub (40),
- wherein the shaft nut (15), in a portion (19) adjacent to the compressor wheel (12), has a shaft nut bore (18) extending from the internal thread (17) to the compressor wheel, and wherein the shaft nut bore (18) of the shaft nut (15) has an inner diameter (D2) greater than
  (a) an internal thread diameter (D1) of the shaft nut (15) and
  (b) a shaft outer diameter of the shaft (5) inside the shaft nut bore (18),
- whereby securing of the shaft nut (15) to shaft (5) forms a free annular space between the shaft nut (15) and the shaft (5) from the start of the compressor wheel hub (40) to the shaft nut internal thread (17),
and
- wherein the sealing sleeve (14) has a sleeve housing (25) with two ends faces and a sleeve bore (26) which has two end regions (27, 28) whose inner diameters (D6, D7) are greater than an inner diameter (D8) of a central region (29), the central region (29) being arranged between the end regions (27, 28), the inner diameters (D6, D7) forming a free annular space between a non-waisted portion of the shaft outer diameter and the sealing sleeve inner diameters in the two end regions (27, 28) of the sealing sleeve (14), whereby the sealing sleeve (14) is enabled to tilt about its center of gravity and to rest evenly on said two end faces upon tightening of the compressor nut.

5. The shaft assembly (1A) as claimed in claim 4, wherein the lengths (L1, L2) of the end regions (27, 28) are equal.

6. The shaft assembly (1A) as claimed in claim 5, wherein the length (L3) of the central region (29) is greater than the lengths (L1, L2) of the end regions (27, 28).

7. The shaft assembly (1A) as claimed in claim 4, wherein one transition region (30 and 31) with a continuously increasing diameter is provided between the end regions (27, 28) and the central region (29).

8. The shaft assembly (1A) as claimed in claim 1, wherein the shaft (5) has a bearing region (32) for bearing the compressor wheel (12), which extends from the free end region (16) in the direction of the turbine wheel (2), which bearing region (32) comprises the waisted portions (33, 34) whose outer diameters (A1 and A2) are smaller than the outer diameters (A3 and A4) of non-waisted portions (35, 36) adjoining the waisted portions (33, 34).

9. The shaft assembly (1A) as claimed in claim 1, wherein the compressor wheel (12) is composed of an aluminum alloy.

10. The shaft assembly (1A) as claimed in claim 1, wherein a stop disk (37) is arranged between the sealing sleeve (14) and a shaft region (38) of the shaft (5).

11. The shaft assembly (1A) as claimed in claim 1, wherein a plane of a start of the hub (40) of the compressor wheel (12) is spaced from a blade leading edge plane (41) approximately by a distance of a blade root rounding (R).

* * * * *